US005394178A

United States Patent [19]

Grange

[11] Patent Number: 5,394,178

[45] Date of Patent: Feb. 28, 1995

[54] PRINTHEAD SERVICING APPARATUS WITH PIVOTAL SERVICING LEVER

[75] Inventor: Jeffrey J. Grange, Brush Prairie, Wash.

[73] Assignee: Hewlett-Packard Company, Palo Alto, Calif.

[21] Appl. No.: 994,250

[22] Filed: Dec. 21, 1992

[51] Int. Cl.[6] .............................................. G01D 15/18

[52] U.S. Cl. .......................................... 347/32; 347/33

[58] Field of Search ................ 346/140 R; 347/32, 33

[56] References Cited

U.S. PATENT DOCUMENTS

| | | | |
|---|---|---|---|
| 4,437,105 | 3/1984 | Mrazek et al. | 346/140 R |
| 4,441,110 | 4/1984 | Hatakeyama et al. | 346/140 R |
| 4,511,906 | 4/1985 | Hara | 346/140 R |
| 4,684,963 | 8/1987 | Naka | 346/140 R |
| 4,853,717 | 8/1989 | Harmon et al. | 346/140 R |
| 5,027,134 | 6/1991 | Harmon et al. | 346/140 R |
| 5,081,472 | 1/1992 | Fisher | 346/140 R |
| 5,097,276 | 3/1992 | Midorikawa | 346/140 R |
| 5,103,244 | 4/1992 | Gast et al. | 346/140 R |
| 5,115,250 | 5/1992 | Harmon et al. | 346/140 R |

FOREIGN PATENT DOCUMENTS

| | | | |
|---|---|---|---|
| 0410691 | 1/1991 | European Pat. Off. . | |
| 0494674 | 7/1992 | European Pat. Off. . | |
| 60-224550 | 8/1985 | Japan | 346/140 R |

*Primary Examiner*—Benjamin R. Fuller
*Assistant Examiner*—Valerie Lund

[57] ABSTRACT

An apparatus for use in servicing a printer's printhead is provided which includes an elongate lever pivotally coupled with the printer's chassis so as to accommodate pivoting movement of the lever between a free orientation and a printhead-servicing orientation. A servicing member such as a wiper is mounted on the lever, the servicing member selectively being brought into operative association with the printhead by pivotal movement of the lever into the printhead-servicing orientation. Lever pivoting is controlled via cammed engagement between the lever and a printer carriage.

12 Claims, 3 Drawing Sheets

PRINTHEAD SERVICING APPARATUS WITH PIVOTAL SERVICING LEVER

TECHNICAL FIELD

The present invention relates generally to an apparatus suited for use in the servicing of a printer's printhead. More particularly, the invention concerns an apparatus employing a lever which pivots upon selected printer carriage motion to bring a servicing member into operative association with the printer's printhead. Although the apparatus has wide utility, being suited for use in the execution of virtually any printhead servicing operation, it has proven to be particularly well suited for use in the wiping of a printhead in an ink-jet printer and is described as such herein.

BACKGROUND ART

To keep a printer in proper operating condition, it is necessary periodically to perform service operations on the working components thereof. An ink-jet printer, for example, requires frequent servicing of its printhead so as to maintain print quality. Such servicing also helps to prevent unnecessarily rapid deterioration of the printhead, a characteristic which is due in large part to the accumulation of particulate in the vicinity of the printhead nozzle. More specifically, print quality and printhead deterioration result from the gathering of such particulate in the nozzle's ink port so as to plug the flow of ink.

In order to address the aforementioned problem, it is conventional to equip an ink-jet printer with apparatus by which the printer's printhead may be wiped and capped by servicing members which are mounted on a servicing apparatus. Most conventional servicing apparatus, however, have required operator intervention, often taking the printer off-line for extended periods of time. Such apparatus have also been prone to printhead contamination where plural printheads are employed, and have experienced problems related to interference between the servicing members and the printhead carriage.

Improved servicing apparatus have been proposed which provide solutions for the various problems set forth above, but such solutions tend to require complex servicing member delivery structure, increasing finished product cost. One such apparatus is described in co-pending U.S. patent application Ser. No. 07/949,197 entitled "Ink-jet Printhead Capping and Wiping Method and Apparatus", which was filed on Sep. 21, 1992, and which is owned commonly herewith. Another is set forth in U.S. patent application Ser. No. 07/954,846 entitled "Printhead Servicing Station for Printers", which was filed on Sep. 30, 1992, and which is also commonly owned herewith. The disclosures of these patent applications are incorporated herein by the present references thereto.

DISCLOSURE OF THE INVENTION

The present invention addresses the above-identified problems by providing an improved apparatus for use in servicing a printer's printhead, such apparatus including an elongate lever which is coupled with the printer's chassis so as to accommodate pivotal movement of the lever between a free orientation and a printhead-servicing orientation. Mounted on the lever adjacent one of its ends is a servicing member which selectively operates on the printer's printhead to service the same. Servicing occurs when the servicing member is brought into operative association with the printhead by corresponding pivotal movement of the lever into the printhead-servicing orientation. Lever pivoting is controlled via a cammed engagement between the lever and the printer's printhead carriage which reciprocates horizontally relative to the printer's chassis. Preferably, the carriage includes a cam surface and the lever includes a follower, the follower being arranged to traverse the cam surface for directing pivot of the lever relative to the printer's chassis.

DETAILED DESCRIPTION AND BEST MODE FOR CARRYING OUT THE INVENTION

As stated above, the present invention relates generally to printers, and, more particularly, to an apparatus for use in effecting controlled service of a printer's printhead. The invention is suitable for use in virtually any style printer, but has demonstrated particular utility in the servicing of printheads in ink-jet style printers and is thus described as such herein.

Figure 1:
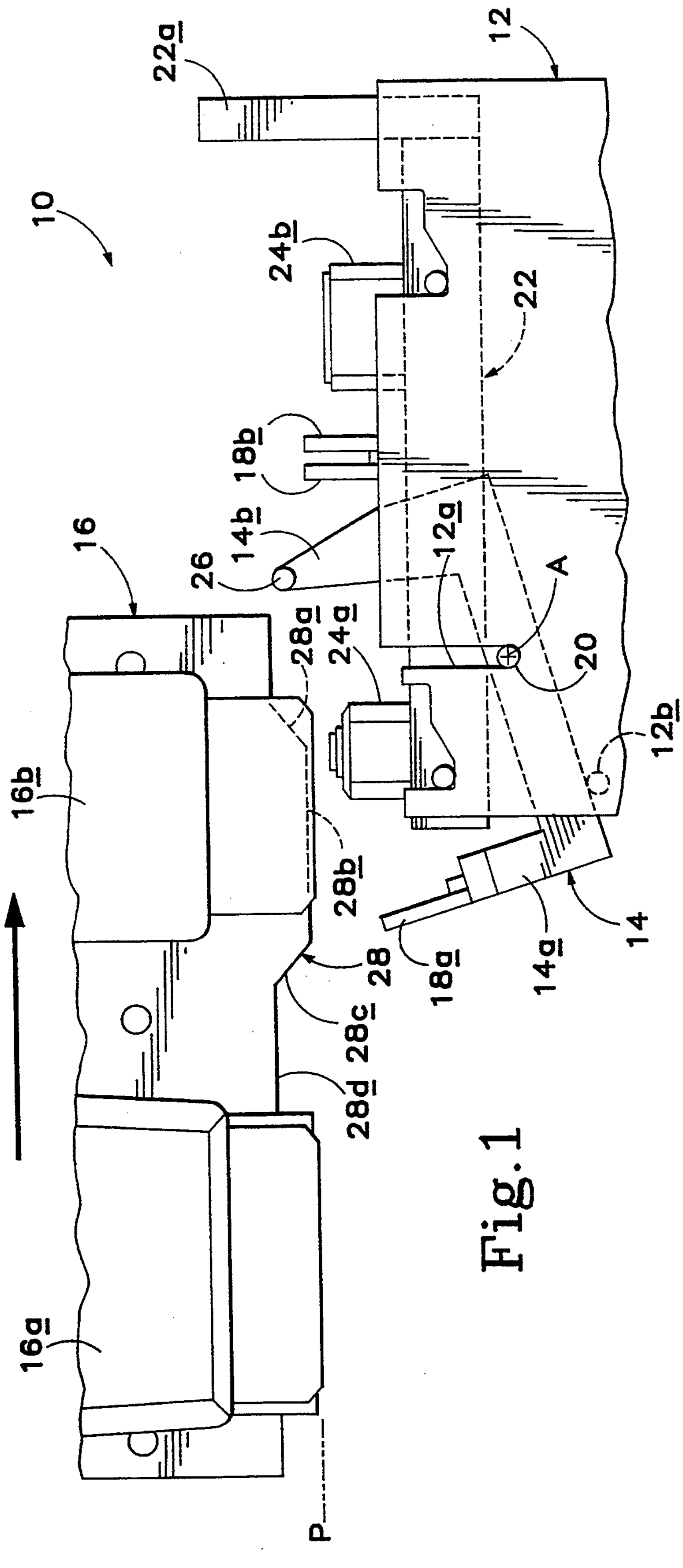
FIGS. 1 through 3 are simplified front elevations of the invented printhead servicing apparatus, made in accordance with a preferred embodiment of the invention and showing various phases of its operation.
Figure 2:
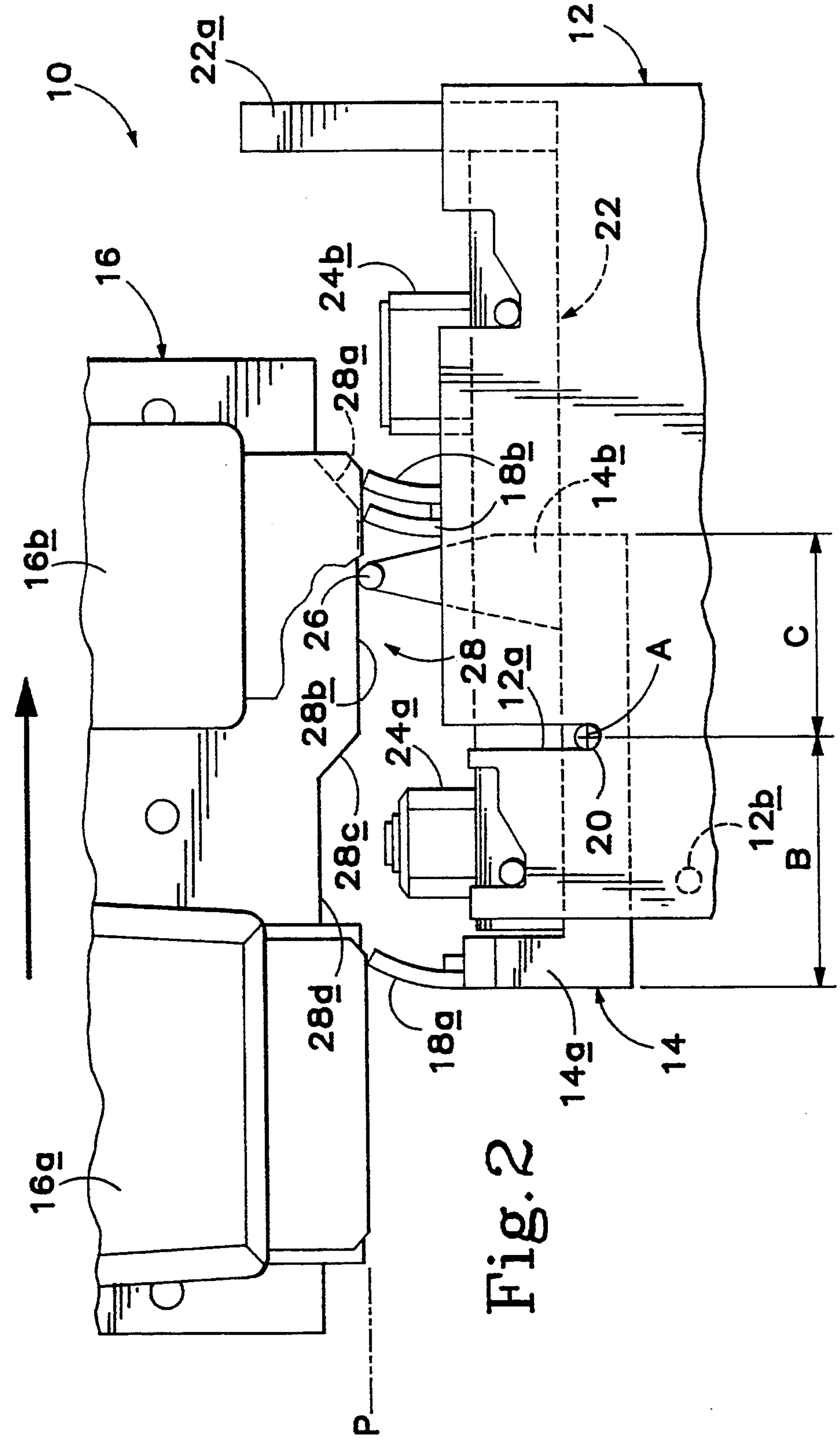
Figure 3:
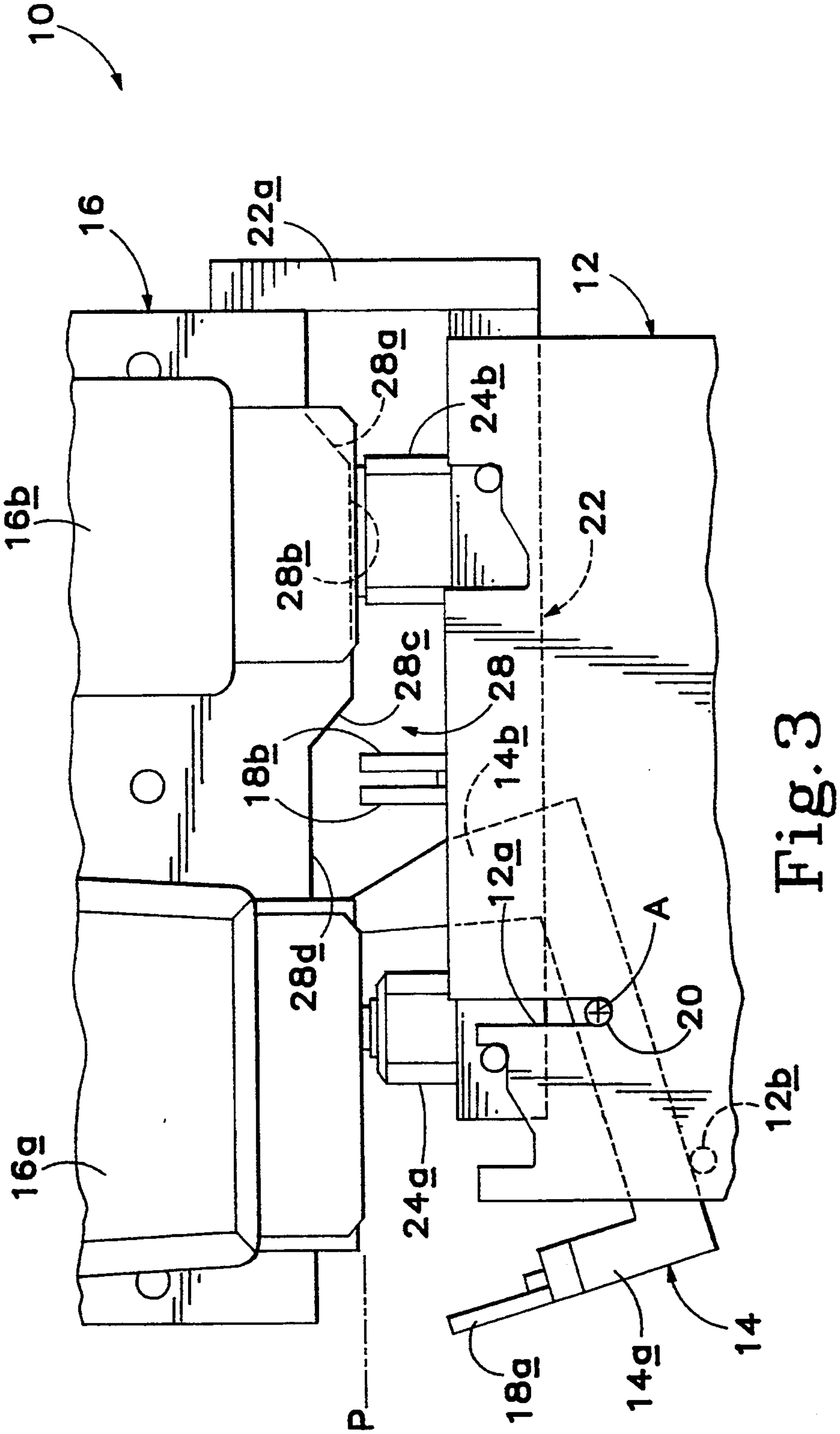

FIGS. 1 through 3 show, fragmentarily and in somewhat simplified form, an ink-jet printer 10 in front elevational view. Printer 10, it will be appreciated, employs a preferred embodiment of the invented servicing apparatus, such apparatus being shown in various phases of its operation as will be described in detail below. The reader is thus provided with a series of drawings which show the printer in the vicinity of invented apparatus so as to illustrate printer operation during a typical printhead servicing routine.

Serving as a reference relative to which the movement of various components is described, is a base 12 (shown only fragmentarily and in greatly simplified form). In the depicted embodiment, the base forms a part of the printer's chassis, the base being integrally molded therewith. It will be recognized, however, that the base may alternatively be formed from structure which is separate from the chassis, but is suitably mounted on the chassis so as to provide a generally stationary base.

Pivotally coupled with chassis 12 is an elongate lever 14, such lever being arranged to pivot between a free orientation (shown in FIGS. 1 and 3) and a printhead-servicing orientation (shown in FIG. 2). As shown in FIGS. 1 through 3, lever 14 is coupled with the chassis via an elongate shaft 20, such shaft defining an axis A along its length. Axis A, it will be appreciated, serves as the axis about which the lever is pivoted. Preferably, the shaft is seated in a chassis aperture such as notch 12*a*, with the shaft acting as a fulcrum for the lever. With reference to such arrangement, it will be noted that the lever preferably takes the form of an elongate seesaw member having first and second elongate end regions 14*a*, 14*b*. As best shown in FIG. 2, the end regions are of different lengths, the first end region being of greater length than the second end region. Such disparity is illustrated by reference to designators B and C in FIG. 2 which refer to the lengths of the first and second end regions respectively. By virtue of the disparate lengths, those skilled in the art will appreciate that end region 14a is of greater moment than end region 14b, biasing the seesaw member toward the free orientation shown in FIG. 1. Pivoting beyond this orientation is prevented by a stop 12b which is engaged by the seesaw member to halt its pivot. It will also be, upon reference to the drawing sheets, appreciated that such lever, or seesaw member, is mounted for pivoting in a plane which is generally parallel to the plane of the drawing sheets, but behind the plane of the drawing sheets so as to avoid unwanted interference as will be described below.

Lever pivoting is effected by selected engagement of the lever by a carriage 16, such carriage being mounted for generally horizontal reciprocating movement relative to the printer's chassis so as to selectively urge the lever into its printhead-servicing orientation and allow it to fall back into its free orientation. In the depicted embodiment, carriage 16 is the printer's printhead carriage, carrying a pair of ink-jet printheads 16a, 16b, each having a lower printing surface which lies in a substantially horizontal plane P. It is to be understood that, although a printer employing two printheads is used in the preferred embodiment, any number of printheads may be used.

By operation as will be described below, carriage 16 engages lever 14 under direction of a controller, the controller preferably including a microprocessor which may be programmed to effect a predetermined carriage movement routine. Such carriage movement routine effects controlled pivoting of the apparatus' lever placing a servicing member such as wiper 18 into operative association with printhead 16a for servicing thereof.

The invented apparatus preferably also includes a printhead-servicing sled 22, such sled mounting a pair of printhead caps 24a, 24b, which are suited for use in capping corresponding printheads 16a and 16b. As shown, the sled and chassis are cam-coupled for controlled, relative movement therebetween. Movement of carriage 16 into engagement with the sled (as best shown in FIG. 3) produces slight vertical and lateral movement of the sled from a lowered position wherein the printhead carriage is reciprocable without interference between the printheads and the caps (FIGS. 1 and 2), to an elevated position wherein caps 24a, 24b cap corresponding printheads 16a and 16b (FIG. 3). Such a cammed arrangement is described generally in my copending U.S. patent application Ser. No. 07/994,384, entitled PRINTHEAD SERVICING APPARATUS, which was filed, Dec. 21, 1992, and which is commonly owned herewith.

In a service mode of operation of the printer, carriage 16 engages lever 14 to pivot such lever into a printhead-servicing orientation. As indicated, such pivot does not occur until after one of the printheads 16b has passed wiper 18a. The first end region 14a mounts a wiper 18a and the second end region 14b includes a follower 26. Upon carriage movement in the direction indicated by the arrow in FIG. 1, follower 26 engages a cam surface 28 on carriage 16, such cam surface including a series of alternating ramped and horizontal regions 28a, 28b, 28c, 28d. Upon such cammed surface engaging follower 26, a force is exerted on lever 14 which urges the lever from its free orientation shown in FIG. 1 to its printhead-servicing orientation shown in FIG. 2. Such transition is made gradually due to passage of the follower along a ramp region 28a wiper 18a thus being placed in a predefined wiping position relative to the printer's printheads.

Once lever 14 is in the printhead-servicing orientation, the follower travels along a substantially horizontal region 28b as the carriage moves in the direction indicated by the arrow in FIG. 2. During such travel, an upper terminal end of wiper 18a, wipes across surface of the other printhead 16a, such wiper having been placed in coincidence with plane P and thus selectively into coincidence with the lower planar surfaces of the printheads. At the same time wiper 18a is wiping printhead 16a, a second servicing member in the form of wiper 18b, is wiping printhead 16b. The second wiper is fixedly mounted directly on the printer's chassis, it being unnecessary for the second wiper ever to be passed out of the way to avoid cross-contamination between the printheads.

As also shown in the drawing figures, cam surface 28 includes a second ramp region 28c which is essentially a mirror image of ramp region 28a. Upon continued passage of the carriage beyond the limits of interface between the printheads and their corresponding wipers, follower 26 will pass along ramp 28c, returning lever 14 to its original orientation.

Preferably, lever 14, including follower 26, is unitary, being injection molded from a polymer material having a TEFLON® filler. In order to provide a suitably lower coefficient of friction with the follower, the cam surface of the carriage is same-polymer injection molded, but its polymer material preferably has no TEFLON® filler. It has been found that these materials provide for smooth cam action and durability. Obviously, other suitable materials may be used, although, of course, lightweight, easily and inexpensively manufactured parts are preferred.

In the progression from a printing mode of operation to a service mode of operation, the printheads are first wiped, as may best seen by contrasting FIGS. 1 and 2, by relative movement between carriage 16 and the lever 14, with the camming surface on carriage 16 and the follower 26 on lever 14 producing substantially vertical upward movement of wiper 18a, relative to carriage 16. Thus, FIG. 2 may be seen to illustrate wiping of the printheads by cam-coupling of the lever and the printhead carriage wherein the plane defined by the lower surfaces of the printheads nominally, but with slight interference fit, is co-planar with the plane defined by the upper terminal ends of the wipers.

Moving on to FIG. 3, it will be noted that the carriage has engaged an upstanding member 22a on sled 22, such engagement producing lateral and vertical movement of the sled via the cammed relationship between the sled and the printer's chassis. By such movement, the caps 24a, 24b are placed with their uppermost ends in the plane defined by the lower surfaces of the printheads so as to effect capping of such printheads. At this point, the wipers have already passed across the surfaces of the printheads and are no longer necessary to effect capping.

It will be appreciated by those skilled in the art that, although in FIG. 3 lever 14 has been shown to move back into its free orientation by virtue of ramp region 28c, it is not necessary for the purpose of capping that such return occur. Consequently, cam surface 28 may be defined by the simple inclusion of a ramp region and a substantially horizontal region which extends substantially across the remainder of the printer carriage so as not to require multiple pivoting of the lever 14.

While the above apparatus is described as involving the wiping and optional capping of a printhead, it will be appreciated that the invention is also compatible with various other printhead-servicing operations. It should also be appreciated that although a multi-printhead printer has been herein described, this operation may also prove useful in servicing of a single printhead wherein various servicing operations must be performed without cross-contamination of ink between printheads during individual printhead servicing operations.

INDUSTRIAL APPLICABILITY

It may be seen that the invented apparatus enables automatic servicing of a printhead, providing multi-directional wiping of each printhead by a separate wiper to avoid printhead re-contamination or inter-printhead contamination. Few, relatively simple parts are required to provide a relatively low-cost service solution. This is made possible by employing a simple pivotal lever for carrying printhead servicing member between a free position and a printhead servicing position. Lever pivot is controlled by reciprocal, horizontal movement of the printer's carriage, the lever thus being directed through its various orientations to service the printhead as needed. The invented apparatus requires no operator intervention, minimizes the printer off-line time, and automatically restores the printer from its servicing mode to its printing mode of operation.

While the present invention has been shown and described with reference to the foregoing operational principles, in the preferred embodiment, it will be apparent to those skilled in the art that other changes in form and detail may be made therein without departing from the spirit and scope of the invention as defined in the appended claims.

I claim:

1. An apparatus for use in servicing a printer with a printhead, said apparatus comprising:

a carriage mounted for movement relative to a chassis of the printer, said carriage including a cam surface having a ramp region; and a lever pivotally coupled with the chassis, said lever mounting a printhead-servicing member and including a follower configured to traverse the cam surface of the carriage, said carriage selectively engaging said lever to pivot said lever between a free orientation and a printhead-servicing orientation.

2. The apparatus of claim 1, wherein said lever is biased toward said free orientation.

3. The apparatus of claim 1, wherein pivoting of said lever into said printhead-servicing orientation moves said servicing member into operative association with the printer's printhead.

4. The apparatus of claim 1, wherein said cam surface includes a horizontal region adjacent said ramp region, said follower traversing said ramp region to place said lever into said printhead-servicing orientation, and said follower traversing said horizontal region to maintain said lever in said printhead-servicing orientation.

5. The apparatus of claim 1, wherein said carriage mounts pair of printheads in a configuration whereby one printhead is carried past said servicing member with said lever in said free orientation and another printhead is carried past said servicing member with said lever in said printhead-servicing orientation.

6. The apparatus of claim 5 which further includes a second printhead-servicing member fixedly mounted relative to the chassis such that the one printhead is serviced by said second printhead-servicing member.

7. An apparatus for use in servicing a printer with a printhead, said apparatus comprising:

a lever pivotally coupled with a chassis of the printer, said lever mounting a wiper; and a carriage mounted for movement relative to the chassis, said carriage selectively engaging said lever to pivot the lever between a free orientation and a printhead-servicing orientation;

said wiper being mounted such that movement of said lever into said printhead-servicing orientation places said wiper into a predefined wiping position relative to the printhead.

8. The apparatus of claim 7, wherein the printhead is wiped by relative movement between said carriage and said wiper, said wiper being maintained in said predefined wiping position by cam-coupling between said lever and said carriage.

9. An apparatus for use in servicing a printer with a printhead, said apparatus comprising:

a carriage mounted for horizontally reciprocal movement relative to the printer's chassis, said carriage including a cam surface having a ramp region; and an elongate seesaw member mounted for pivotal rotation relative to the printer's chassis, said seesaw member having first and second end regions with said first end region mounting a wiper and said second end region including a follower configured for traverse of the cam surface upon carriage movement, traverse of said cam surface by said follower directing pivot of said seesaw member between a free orientation wherein said wiper is spaced from the printer's printhead and a printhead-servicing orientation wherein said wiper engages the printer's printhead to effect service thereof.

10. The apparatus of claim 9, wherein said first end region has greater moment than said second end region, biasing said seesaw member toward said free orientation.

11. The apparatus of claim 9, wherein said carriage mounts a pair of printheads in a configuration whereby one printhead is carried past said wiper with said seesaw member in said free orientation and another printhead is carried past said wiper with said seesaw member in said printhead-servicing orientation.

12. The apparatus of claim 11 which further includes a second wiper fixedly mounted relative to the printer's chassis such that the one printhead is serviced by said second wiper.

* * * * *